United States Statutory Invention Registration [19]

[11] Reg. Number: H441

Milton et al. [43] Published: Mar. 1, 1988

[54] TECHNIQUE AND MECHANISM FOR HOT SPALL TESTING UNDER PRESSURE

[75] Inventors: Robert W. Milton, Huntsville; Lawrence B. Thorn, Madison, both of Ala.

[73] Assignee: The United States of America as represented by the Secretary of the Army, Washington, D.C.

[21] Appl. No.: 99,197

[22] Filed: Sep. 4, 1987

[51] Int. Cl.[4] ..... G01L 5/14; G01N 25/00

[52] U.S. Cl. ..... 374/8; 73/167

[56] References Cited

PUBLICATIONS

"Current Spall Tester", (Code Identification No. 18876), US Army Missile Command, Redstone Arsenal, Alabama.

*Primary Examiner*—Deborah L. Kyle
*Assistant Examiner*—Michael J. Carone
*Attorney, Agent, or Firm*—John C. Garvin, Jr.; Freddie M. Bush

[57] ABSTRACT

The hot spall tester comprises a tube furnace portion adapted for retaining a magazine portion for containment of a plurality of steel ball bearings which are heated and individually dropped through a feed tube member to a programmed or manually operated carrousel portion having a plurality of sample cups for receiving and containing individual solid propellant samples to be spall tested in accordance with the method. A torque rod is employed to facilitate rotation of the magazine portion and carrousel portion in a vertically aligned relationship with the magazine portion so that the heated steel ball is delivered by gravity through a feed tube to a sample cup of the carrousel portion positioned below the magazine portion. In operation the magazine portion and carrousel portion are aligned and vertically positioned to provide a calculated transit time for the steel ball bearing to drop by gravity to the propellant in the sample cup. Subsequent rotation of the carrousel of about 22.5 degrees positions the cup containing the propellant sample and hot steel ball bearing under a piston having about 0.0001 inch clearance with the carrousel whereby because of its close tolerance, the piston retains the propellant and hot steel ball bearing in a confined pressure relationship during any pressure buildup. For an eight unit capacity of the magazine portion and carrousel portion the sequence can be repeated either manually or automatically eight times to evaluate a solid propellant composition reaction to a hot spall.

5 Claims, 4 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

TECHNIQUE AND MECHANISM FOR HOT SPALL TESTING UNDER PRESSURE

DEDICATORY CLAUSE

The invention described herein may be manufactured, used, and licensed by or for the Government for governmental purposes without the payment to me of any royalties thereon.

BACKGROUND OF THE INVENTION

A potential hazard to many field based weapon systems is the threat of gunfire and shrapnel or metal fragments thereof. The safety of the soldiers and the survivability of the system is based on the ability of the weapons of the system to absorb these fragments without deflagrating or detonating of the propellant. In particular, missile systems that are based in hostile territory are prime candidates for targeting of bullets and mortar, and realistically, a certain percentage of any deployed missile system will, at one time or another, be the subject of a hostile attack involving gunfire, or artillery. For this reason, it is extremely important to know what kind and how much metal fragments these missiles can absorb before failure of the propellant system.

A major contributing factor to the deflagration of solid propellant relates to the heat transfer between a hot fragment and the propellant. In other words, the propellant is ignited by the hot fragment.

In a "real world" scenario, the hot fragment is shot and then imbedded into the propellant. As this happens, three things can happen: 1. the propellant does not react to the fragment; 2. the fragment causes the propellant to detonate immediately; or 3. the fragment smolders in the propellant, gives off exhaust gasses, builds up a critical pressure, and finally deflagrates or detonates.

The testing of propellant to determine its reaction to a hot metal fragment has been achieved by crude spall testing. The subject of spall testing therefore is not new, and there have been different machines designed for this purpose.

These machines all consist of manually heating up a metal fragment and then dropping it onto a small piece of propellant that is subjected only to atmospheric pressure. The results are observed by eye and the data recorded by hand. A typical prior art spall tester is shown in FIG. 1. Note the crudity of the system, and the fact that the propellant is not confined in any way.

The method used with the above prior art tester has many flaws that raises questions concerning the accuracy of the results. Most importantly, the tester does not accurately reproduce the conditions in which a real propellant sample would be affected by a spall. The important concept to remember is that progressive propellant burn rate is related to the pressure that it is burning under. Some of the most advanced propellants used today burn only slowly, if at all, when exposed to atmospheric pressure. Only when the propellant has built up pressure does it burn with its high energy yield. It is for this reason that the method described above is inadequate for the accurate prediction of propellant reaction to hot fragments. The heated spall is introduced to the propellant in the atmosphere and not confined. This means that the propellant and spall are introduced and maintained at atmospheric pressure, even after the spall has started smoldering. This open condition prevents any pressure buildup and will, in many cases, cause the propellant to fail to ignite. The zero pressure buildup retards the burning of the propellant, and does not realistically simulate the action of a real heated spall in an actual missile case. This inadequacy is a large source of error.

There are other disadvantages of the method. A difference of only a few degrees in the temperature of the fragment can mean the difference between ignition or non ignition. Uniform and exact temperature repeatability are therefore very important in order to get good, accurate test data. In the existing methods, the spalls, small ball bearings, are heated individually in a furnace, and dropped one at a time onto the propellant. Since the balls are heated individually, exact and repeatable temperatures are difficult to obtain. This inconsistency surely adds another element of error to the results. The method is also very time consuming.

Due to the reason stated above, it is an object of the invention to provide a new technique and mechanism that will overcome the disadvantages of the present system as well as add many new advantages.

Another object of this invention is to provide a hot spall tester which will accurately simulate the heat transfer conditions in which a missile's propellant is contacted by a hot spall and when it is ignited under confined pressure.

Still a further object of this invention is to provide a hot spall tester which can also be used to test propellant open to the atmosphere.

SUMMARY OF THE INVENTION

The hot spall tester of this invention comprises a tube furnace portion that is adapted for retaining a magazine portion for containment and heating a plurality of steel balls which are individually dropped through a feed tube member to a programmed or manually operated carrousel portion having a plurality of sample cups for receiving and containing individual propellant samples to be spall tested. A torque rod member is secured to the carrousel portion and the magazine portion in a vertically aligned relationship with the magazine portion so that a heated steel ball is delivered by gravity through a feed tube to a sample cup of the carrousel portion positioned below the magazine portion. The lower end of the torque rod is coupled to a stepping motor which is manually or computer programmed through a controller. The controller provides for a predetermined time delay of about 0.27 seconds to allow for transit time of the steel ball bearing which includes completing its trip through the apparatus and landing on the propellant in the sample cup of the carrousel. After the hot steel ball bearing lands on the propellant the carrousel is then rotated 22.5 degrees in order to put the propellant under a piston which has a clearance of about 0.0001 inch between the carousel and the piston to thereby retain the propellant and steel ball in a confined pressure relationship during a predetermined time delay for determining the reaction between the propellant and hot spall or steel ball. The reaction will be one of the following: (1) propellant will ignite immediately; (2) the propellant will not ignite; or the propellant (3) will smolder, gradually build up pressure, and then ignite. The controller then instructs the stepping motor to initiate a new firing sequence. The firing sequence can be repeated automatically eight times for an eight cup capacity carrousel and an eight unit capacity magazine.

DESCRIPTION OF THE PREFERRED EMBODIMENT

Figure 2:
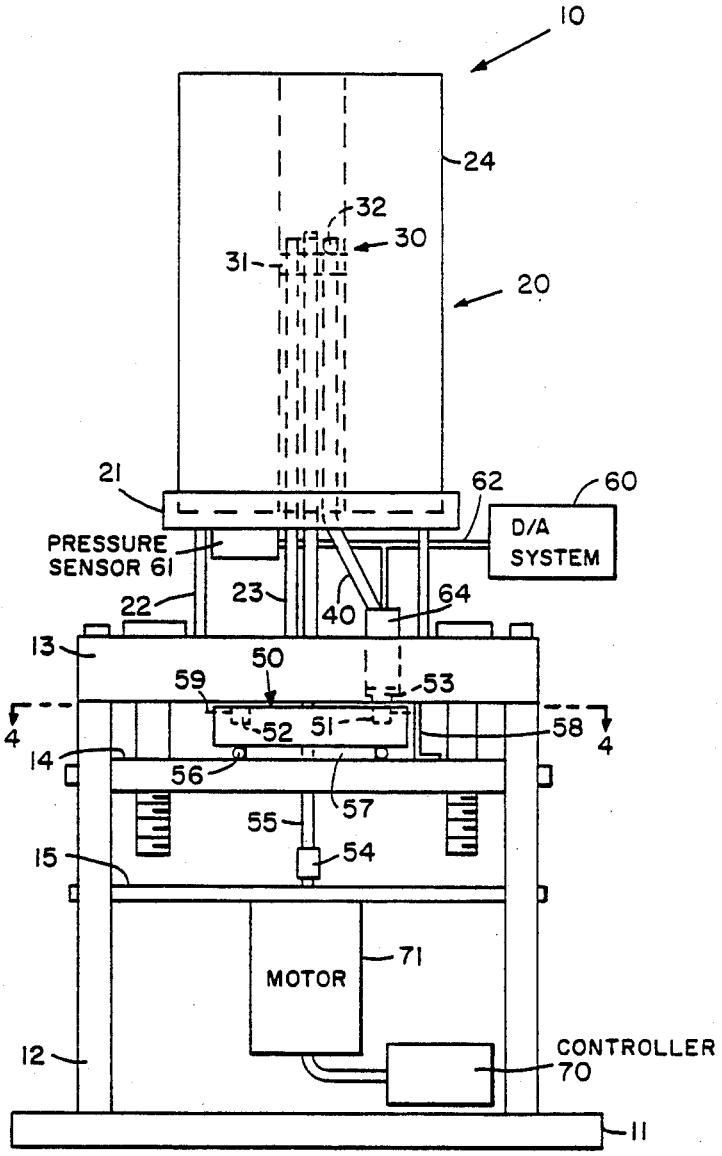
FIG. 2 of the Drawing depicts a side view of the programmable hot spall testing device of the invention.

In reference to FIG. 2 of the Drawing, the hot spall tester 10 comprises a tube furnace portion 20 adapted for retaining a programmable magazine portion 30 supported by programmable magazine support plate 31 within a removable housing member 24. The magazine portion serves to retain a plurality of steel balls, which after being heated, are individually dropped through a feed tube 40 to a programmable carrousel portion which contains a plurality of sample cups 51 for receiving and containing individual propellant samples to be spall tested.

A data acquisition system 60 is employed for acquiring time to ignition, pressure and temperature during burn or other related information for the hot spall tester. Thus, a pressure sensor 61 and a thermocouple 62 indicate what conditions are taking place in the cup below piston 53. A quartz rod 59 described below transmits light from this cup for further output to sensors.

In further reference to FIG. 2 of the Drawing, the hot spall tester 10 structure is provided with a base plate member 11 having side plate members 12 secured thereto in an upright position and secure to a top plate member 13. Intermediate the top plate member and the base plate member is shown a carrousel support plate member 14. Between the carrousel support plate member 14 and the base plate member 11 is shown a support plate 15 for stepping motor 71. Stepping motor 71 is controlled manually or by computer command through collector 70. A support rod 23 is of a variable length to facilitate adjustment of the magazine height prior to connecting to a torque rod for operational rotation. The magazine portion and carrousel portion are connected to the stepping motor 71 by torque rod union 54 which couples torque rod 55 to the designated portions for rotation as described hereinbelow. Thus bearings 56 (Andrew's type) and bearing alignment plate 57 are employed to provide for operational support and to facilitate rotation of carrousel portion while achieving a control of the clearance of only about 0.0001 between an adjustable piston and the rotatable carrousel portion.

A light sensor bracket 58 is shown outside the operational rotation pattern of the carrousel. Quartz rod 59 serves to conduct light from the cup cavity during a burning or testing to monitor what reaction that the propellant is undergoing while the piston 53 is maintaining the sample under a pressurized condition during pressure buildup. Pressure from spring adjuster 64 permits retaining clearance of about 0.0001 inch between the adjustable piston and the carrousel, and when carrousel is rotated to position the piston above the cup, a pressure seal is maintained during pressure buildup.

Figure 1:
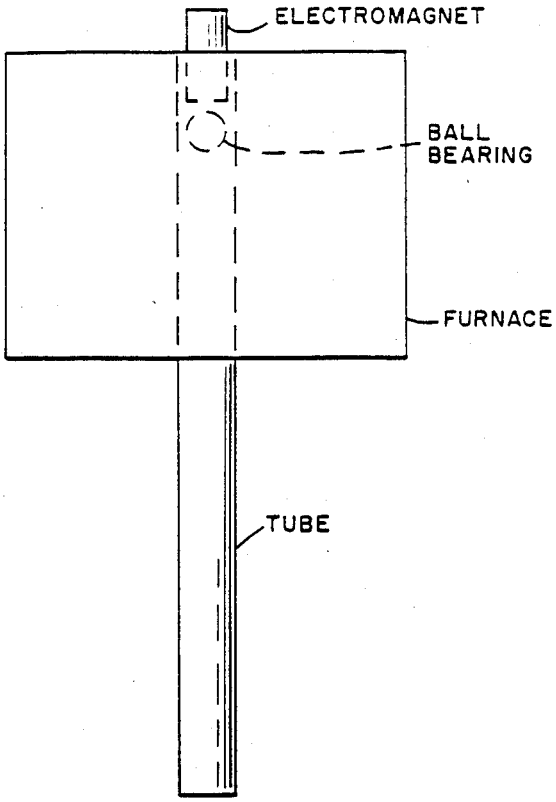
FIG. 1 PRIOR ART
FIG. 1 of the Drawing depicts a prior art hot spall testing device.
Figure 3:
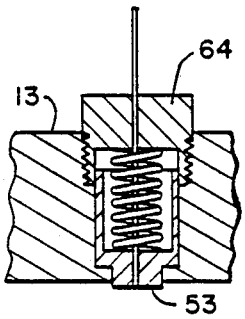
FIG. 3 depicts a sectional view of the top plate with a piston positioned therein.
Figure 4:
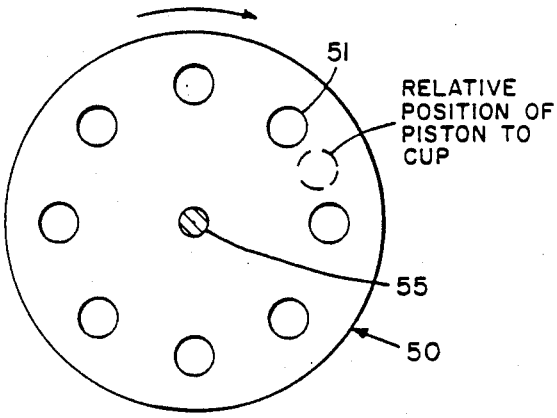
FIG. 4 is a view along line 4—4 of FIG. 2, depicting the carrousel with cups and a superimposed relative position of piston to cup prior to spall testing.

FIGS. 3 and 4 depict a sectional view of the top plate 13 with the piston 53 positioned therein and a relative position of piston to cup prior to spall testing respectively.

The detailed sequence of events below will provide complete instructions for the method of hot spall testing employing the hot spall tester of this invention.

SEQUENCE OF EVENTS (1) The furnace 20 is removed from the furnace support plate 21.

(2) Propellant cups 51 are loaded into the carrousel portion 50.

(3) The ball bearings 32 are loaded into the magazine portion 30.

(4) The furnace 20 is replaced on the furnace support plate 21.

(5) The furnace is adjusted for the desired temperature.

(6) The data acquisition system 60 is powered up and calibrated.

(7) The firing sequence begins.

(8) The controller 70 instructs the motor 71 by a first instruction to rotate the magazine and carrousel 22.5 degrees.

(9) As the rotation is accomplished, the holes in the magazine 30, carrousel 50 and feed tube 40 line up.

(10) The ball bearing 32 leaves the magazine 30, falls through the feed tube 40 and lands in the carrousel 50 on the propellant sample 52 in cup 51.

(11) The controller 70 instructs the stepping motor 71 by a second instruction to wait the required time for the steel ball 32 to complete its fall.

(12) As the ball bearing touches the propellant 52, the data acquisition is begun.

(13) The data being collected will consist of time to ignition, temperature of burn, and pressure during burn.

(14) After the specified time, and with the ball bearing 32 resting on the the propellant 52, the controller 70 instructs the stepping motor 71 by a third instruction to rotate the carrousel 52 22.5 degrees in order to put the propellant sample 52 under the piston 53. ( See FIG. 4 for relative piston of piston to cup prior to final rotation of carrousel to achieve pressure seal with piston).

(15) The clearance between the piston 53 and the carrousel 50 is very small, approximately 0.0001 inches. This minimum clearance will allow the pressure to build up under the piston.

(16) The propellant 52 will react in one of three ways:
It will ignite immediately;
It will not ignite; or
It will smolder, gradually build up pressure, and then ignite.

(17) The controller 70 instructs the stepping motor 71 by a fourth instruction to wait a reasonable amount of time for data acquisition to be completed on this particular sample.

(18) The stepping motor is instructed by the controller 70 to begin firing sequence again.

(19) The firing sequence is repeated automatically eight times.

(20) When all eight samples have been fired, the propellant cups 51 are removed and the furnace 20 is turned off.

(21) The hot spall tester 10 can now be reloaded and the entire procedure can be repeated.

Additional instructions below are for programmed motor sequences.

PROGRAMMED STEPPING MOTOR SEQUENCE (1) The holes in the magazine 30, feed tube 40, and the carrousel 50 should be lined up.

(2) Manually instruct the controller 70 to rotate the carrousel 50 exactly 22.5 degrees (50 half steps=22.5 degrees. Each full step is 0.9 degrees, so a half step would be 0.45 degrees).

(3) This position is the "zero" setting. This "between holes" position would be the last in the sequence of events. This is where the propellant has been ignited and burned. This would be the correct orientation for another sequence to commence.

(4) The controller 70 must be programmed so that on a signal from the computer or the operator, the firing sequence can be initiated.

(5) Once the sequence has begun, the controller 70 must be programmed to rotate 22.5 degrees (50 half steps). This rotation and new alignment will enable a ball bearing to drop from the magazine 30 through the feed tube 40, and finally to land on the propellant sample 52 in sample cup 51 in the holes of the carrousel.

(6) The controller 70 must wait approximately 0.27 seconds in order for the ball bearing 32 to complete its trip through the apparatus and land on the propellant sample 52 in sample cup 51 in the carrousel. This time is calculated using the equation $$Y-Yo=0.5\,At^2$$

wherein:

Y−Yo=vertical displacement (14 in.)

A=acceleration due to gravity (32.2 ft/sec$^2$)

t=time (sec)

The time calculated from the equation is to approximate the time required for a heated ball bearing to be delivered by gravity from a magazine through a tube to a propellant sample in an aligned carrousel cup below. Experimental runs may be required to determine exactly the predetermined optimum time for the carrousel 50 to wait prior to being rotated to achieve the pressure tight seal with the piston as noted below.

(7) After this amount of elapsed time, the carrousel 50 must be rotated exactly 22.5 degrees in order to put the propellant 52 under the piston 53. This orientation is the same as the "zero" position discussed in step 3. This is also the step where the propellant is ignited.

(8) After waiting a specified length of time, perhaps five minutes or so, the motor should be instructed by the controller 70 to begin the sequence firing sequence again.

(9) The spall tester 10 has the capability to fire eight times before reloading.

The hot spall tester is designed to accurately simulate the heat transfer condition in which a missile's propellant is contacted by a hot spall and is ignited under confined pressure. It follows that should the propellant be desired to be tested without being under confined pressure, piston 53 can be inactivated or the rotation sequence can be interrupted to prevent the piston from confining the pressure after the hot steel is dropped on the propellant sample. It is recognized by one skilled in the art that the following advantages are offered for this new approach to the hot spall tester and the disclosed procedure for using the tester set forth hereinabove. The advantages are:

(1) confines the propellant in a pressure vessel in order to accurately simulate the buildup of pressure that a "real" spall would cause in a missile case;

(2) maintain accurate temperature repeatability so that the results are accurate;

(3) take specific data such as spall temperature, pressure buildup, time to ignition, and flash;

(4) take data accurately and conveniently by electronics instead of "by eye";

(5) have a high degree of repeatable accuracy;

(6) automate the system;

(7) design the system to operate from a distance as a precautionary measure to prevent injury to personnel;

(8) spall tester has low maintenance; and the (9) design for the system can be made to achieve efficiency and ease of operation.

We claim:

1. A hot spall tester comprising:

(i) structural components comprising: (a) a base plate, (b) a pair of side plates mounted vertically to said base plate in a spaced apart relationship to provide stability and support for said hot spall tester; (c) an intermediate motor support plate mounted perpendicularly to each of said side plates, (d) a top support plate mounted parallel to said intermediate motor support plate and to each of the top surfaces of said vertically mounted side plates, (e) an adjustable thrust bearing alignment plate mounted in a parallel relationship to and below said top support plate for providing adjustment to thrust bearings for a rotatable carrousel portion, and (f) thrust bearings mounted on said thrust bearing alignment plate;

(ii) a rotatable carrousel portion having a plurality of sample cup shaped compartments arranged in circular and evenly spaced positions around the top surface of said rotatable carrousel portion, said rotatable carrousel position when in operational position being positioned on said thrust bearings mounted on said thrust bearing alignment plate;

(iii) a tube furnace portion including an outer housing member supported by a furnace support plate, said furnace support plate supported by support rods secured to said furnace support plate and to the surface of said top support plate, said tube furnace portion including an outer housing member being easily removable from said furnace support plate to facilitate access to internal cavity of said tube furnace to permit the loading of steel ball bearings to a magazine portion of said hot spall tester;

(iv) a magazine support plate positioned at the centerline of said tube furnace, said magazine support plate supported by variable height support rods extending from said magazine support plate to a top surface of said top support plate, and said magazine support plate having an opening to permit the individual dropping of a steel ball bearing from a magazine portion to a feed tube leading to an aligned sample cup of a carrousel portion;

(v) a rotatable magazine portion positioned above said magazine support plate, said magazine portion having a plurality of evenly spaced openings or chambers for containing steel ball bearings which after being heated are to be individually dropped by gravity travel to a sample cup of said carrousel portion;

(vi) a feed tube member positioned between said magazine portion and said carrousel portion to provide gravity travel capability from an aligned opening of said magazine portion to an aligned sample cup of said carrousel portion that receives a dropped heated steel ball bearing;

(vii) a torque rod positioned and extended through said intermediate support plate, said torque rod positioned and extended through an opening at center line of said carrousel portion member, positioned and further extended through an opening in said top support plate positioned and further extended through an opening in said furnace support plate, and further extended through an opening at the centerline of said magazine support plate, and said torque rod coupled at the lower portion to said carrousel portion and at the upper portion to said magazine portion to achieve simultaneous rotation of said magazine portion and said carrousel portion in a timed and aligned relationship to facilitate gravity travel of a steel ball bearing between an opening of said magazine portion to a propellant sample cup in said sample cup shaped compartment of said carrousel portion by way of said feed tube member;

(viii) a stepping motor coupled to lower end of said torque rod;

(ix) a controller for said stepping motor to achieve rotational movement of said carrousel portion and said magazine portion with a 0.9 degree rotation per full step of said stepping motor to achieve the result after rotation is accomplished including the required alignment of openings in said magazine, in said carrousel, and in said feed tube to permit passage of a heated steel ball bearing to touch a propellant sample in said sample cup shaped compartment of said carrousel portion;

(x) means to acquire data as said heated steel ball bearing contacts the propellant sample, said data acquired including time to ignition, temperature of burn, and pressure during burn; and (xi) means to confine and allow pressure buildup in said sample cup shaped compartment after heated steel ball bearing touches a propellant sample in said sample cup shaped compartment of said carrousel portion.

2. The hot spall tester as defined in claim 1 wherein said means to confine and allow pressure buildup in said sample cup shaped compartment comprises a piston mounted in said top plate with a spring adjuster portion to provide precision adjustment of piston to retain a clearance between said piston and said carrousel portion when in normal operation of about 0.0001 inch to thereby allow pressure to build up under said piston after said carrousel portion is rotated the required degrees to put propellant contained in sample cup shaped compartment and in contact with steel ball bearing, under said piston.

3. A method of hot spall testing a solid propellant sample to determine a specific reaction of said solid propellant sample after being contacted with a heated spall dropped by gravity from a magazine portion aligned and timed with a feed tube member which is also aligned with a receiving cup of a carrousel portion, said specific reaction determined to permit a specific-reaction to be classified as one of three types of reaction including propellant igniting immediately, propellant not igniting, or propellant smoldering, gradually building up pressure, and then igniting, said specific-reaction serving to assess the survivability potential of a propellant to gunfire, shrapnel, or metal fragments thereof, said method comprising:

(i) placing steel ball bearings which are to be heated and which are to function as a heated spall into a magazine portion having a plurality of evenly spaced chambers in said magazine portion which is positioned at centerline of the cavity of an elevated tube furnace, said magazine portion supported by a magazine support plate having an opening leading to a feed tube which serves to carry a single heated steel ball bearing by gravity to an aligned sample cup of a carrousel portion;

(ii) placing solid propellant samples into a carrousel portion having a plurality of evenly spaced sample cups, said carrousel portion being vertically aligned and coupled to said magazine portion for rotational operation by a stepping motor operating by instructions from a controller;

(iii) adjusting said tube furnace to a predetermined temperature heating range;

(iv) heating said steel ball bearings to a predetermined temperature;

(v) powering up and calibrating data acquisition system to determine, after heated steel ball bearing is dropped and makes contact with said propellant sample in said carrousel, desired data including time to ignition, temperature of burn, and pressure during burn;

(vi) initiate a programmed firing sequence to begin hot spall testing procedures including rotating said magazine portion and said carrousel portion as further defined hereinbelow under method steps VII–XII, which further comprises:

(vii) instructing said stepping motor by first instruction from said controller to rotate said magazine portion and said carrousel portion a predetermined number of degrees to achieve alignment of an opening of said magazine portion with said feed tube and said receiving sample cup of said carrousel portion;

(viii) instructing said stepping motor by a second instruction from said controller to wait a predetermined time period for said heated steel ball to complete fall by gravity to make contact with said solid propellant sample;

(ix) initiating said data acquistion system as said heated steel ball touches said propellant sample to collect data including time to ignition, temperature of burn, and pressure during burn;

(x) instructing said stepping motor by a third instruction from said controller to rotate said magazine portion of said carrousel portion a predetermined number of degrees to align said sample cup containing said heated steel ball bearing in contact with said propellant sample with a means to confine and allow pressure buildup in said sample cup of said carrousel portion; and (xi) instructing said stepping motor by a fourth instruction from said controller to wait a predetermined time to complete said data acquisition for said sample in said confined and pressure contained status; and, (xii) reviewing and interpreting said data acquired to ascertain reaction type including whether said solid propellant sample ignited immediately, whether said solid propellant sample did not ignite, or whether said solid propellant sample smoldered, gradually built up pressure, and subsequently ignited to thereby complete said method of hot spall testing for a single solid propellant sample.

4. The method of hot spall testing a solid propellant sample as defined in claim 3 wherein said placing of said steel ball bearings is achieved by placing a steel ball bearing in each of said evenly spaced chambers, wherein said placing of said solid propellant sample is achieved by placing a solid propellant sample in each of said evenly spaced sample cups, wherein said first instruction from said controller instructs said stepping motor to rotate said magazine portion and said carrousel portion about 22½ degress to achieve alignment of an opening of said magazine portion with said feed tube member and said receiving sample cup of said carrousel portion, wherein said second instruction from said controller instructs said stepping motor to wait a predetermined time for said heated steel ball bearing to complete fall by gravity to make contact with said solid propellant sample in said receiving sample cup, wherein said third instruction from said controller instructs said stepping motor to rotate said magazine portion and said carrousel portion about 22½ degrees to align said sample cup containing said heated steel ball bearing in contact with said propellant with said means to confine and allow pressure buildup in said sample cup which comprises a piston mounted in a top plate with a spring adjuster portion to provide precision adjustment between said piston and said carrousel portion plate supported or thust bearings mounted on an adjustable bearing alignment to achieve while in normal operation a clearance of about 0.0001 inch and wherein said fourth instruction from said controller instructs said stepping motor to wait a predetermined time to complete said method of hot spall testing for a single solid propellant sample including the data acquistion and interpretation of same for a single solid propellant sample.

5. The method of hot spall testing a solid propellant sample as defined in claim 4 wherein said chambers of said magazine portion are eight evenly spaced chambers, wherein said cups of said carrousel portion are eight evenly spaced cups, and wherein said method of claim 4 is repeated eight times to complete hot spall testing of eight individual samples of solid propellant.

* * * * *